April 14, 1931. C. A. METZGER 1,800,950
METHOD OF AND APPARATUS FOR REMOVING CORE COVERING MATERIAL
Filed Oct. 29, 1927
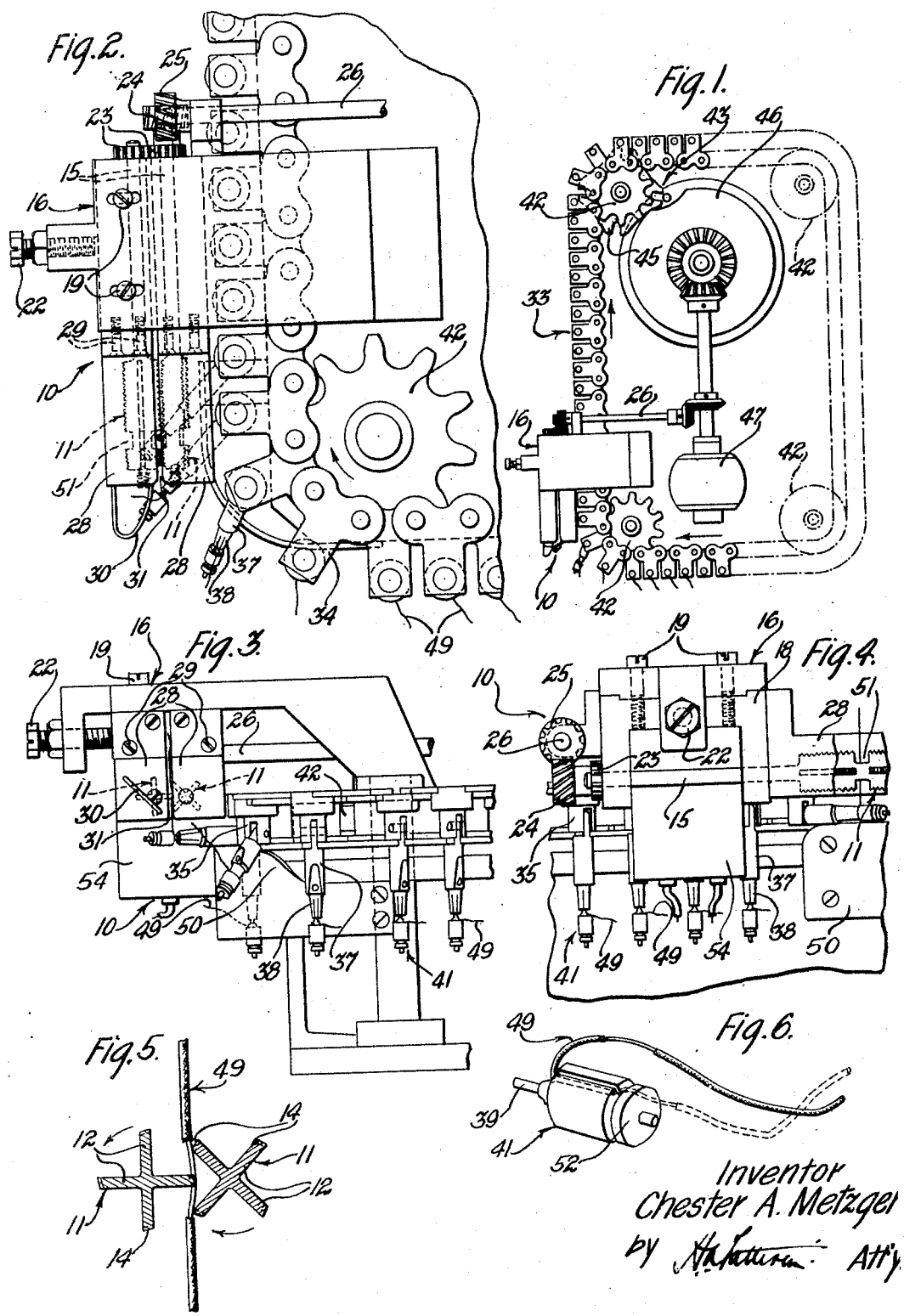
Inventor
Chester A. Metzger
by [signature] Att'y Patented Apr. 14, 1931

1,800,950

UNITED STATES PATENT OFFICE

CHESTER ALLISON METZGER, OF CHICAGO, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR REMOVING CORE-COVERING MATERIAL

Application filed October 29, 1927. Serial No. 229,757.

This invention relates to methods of and apparatus for removing core covering material, and more particularly to methods of and apparatus for removing insulation from conductors.

It is sometimes necessary to remove a portion of the coating or covering of core material in order to permit free access to the core. Thus, for example, in certain types of protective devices, such as fuses, commonly known as heat coils which are used very extensively to protect against abnormal surges in telephone apparatus, an insulated conductor extending from one end of the coil must be partially stripped of its impregnated coating in order to solder the conductor to the opposite end of the coil assembly. In such instances care must be exercised in the removal of the insulation to prevent injury to the conductor and to expose only a predetermined portion of the conductor core.

The primary objects of this invention are to provide an expeditious method of and a durable and efficiently operable apparatus for removing covering material from cores.

In accordance with the general features of the invention, one embodiment thereof by means of which the improved method may be effectively practiced includes a pair of continuously rotating stripping members resembling taps commonly employed in threading drilled holes. Heat coils each having an insulated conductor extending therefrom are intermittently advanced by an endless conveyor and each coil is swung upwardly upon approaching the stripping members, the conductors thereof being subsequently fed between the threads of the members. Adjacent companion portions of the threads effectively remove the conductor insulation and simultaneously advance the conductor lengthwise of the members. The stripping members may be sufficiently heated to prevent the accumulation of insulation wax and the like between the threads and thus the effective, continuous removal of a predetermined portion of the conductor coating may be readily accomplished.

These and other objects will be apparent from the following detailed description when considered in connection with the accompanying drawing, wherein Fig. 1 is a plan view of an apparatus embodying the invention and whereby the improved method may be efficiently practiced, a portion of the endless conveyor being shown diagrammatically;

Fig. 2 is an enlarged fragmentary plan view of the stripping mechanism and associated conveyor disclosed in Fig. 1;

Fig. 3 is an elevational view of the stripping mechanism as viewed from the front in Fig. 2;

Fig. 4 is a fragmentary elevational view of the stripping mechanism as viewed from the left in Fig. 2;

Fig. 5 is an enlarged detailed view of the rotary stripping members shown in section, a heat coil conductor being shown in operative association with the stripping members, and Fig. 6 is a perspective view of the heat coil assembly disclosing the conductor thereof as it appears after having been subjected to the stripping operation.

Referring now to the drawing wherein like numerals have been employed to designate similar parts throughout the various figures, it will be observed that a stripping mechanism is denoted generally by the numeral 10. This stripping mechanism comprises a pair of adjacent stripping members 11 which conform in design to taps, the threads being interrupted so as to present four radial blades or cutters 12 which are provided with threads 14 along their circumferential surfaces (Fig. 5). These taps or stripping members 11 are formed integral with and at one extremity of shanks 15 (Figs. 2 and 4) which are rotatably mounted within a support 16. This support 16 includes a slidable bearing block 18 (Fig. 4) which supports the outermost shank 15 and by manipulating adjusting screws 19 this outermost shank together with its companion stripping member 11 may be moved laterally with respect to the innermost shank and stripping member. Upon loosening the screws 19 another adjusting screw 22 may be manipulated to control the positioning of the outermost stripping member. The external extremities of the shanks 15 are provided with meshing gears 23 and rotation is imparted to these gears through a helical gear 24 which meshes with a companion gear 25 supported on a drive shaft 26. As it is never necessary to adjust the outermost stripping member 11 more than several thousandths of an inch relative to the inner stripping member, it will be readily understood that this adjustment can be performed without causing the disengagement of the gears 23 from each other. The stripping mechanism 10 is further provided with a pair of guide blocks 28 suitably secured by means of screws 29 to the side of the supporting block 16, the outermost guide block 28 being secured to the bearing member 18. Secured to the outer guide block 28 is an arcuate guide rod 30 which is designed to direct conductors fed thereto into proper position within a guideway 31 presented between the guide blocks 28.

An endless conveyor mechanism or chain 33 is formed with a plurality of support arms 34 which are formed integrally with and extend outwardly from each link of the conveyor chain. A depending member 35 (Figs. 3 and 4) on each arm 34 pivotally supports a pin 37 which is provided at its outer or free extremity with a collet 38. This collet 38 is designed to receive a projecting pin 39 of a heat coil assembly 41. The conveyor mechanism 33 is guided by means of suitable chain sprockets 42 (Fig. 1) and intermittent movement in the direction indicated by the arrows in Fig. 1 is imparted to the conveyor chain 33 by means of a Geneva drive mechanism 43. This Geneva drive mechanism 43 includes a Geneva wheel 45 which is adapted to be rotated through one-quarter of a revolution upon each rotation of a driving wheel 46 and continuous rotation is imparted to the driving wheel 46 by means of an electric motor 47 geared thereto.

The heat coil assemblies 41 includes an insulated conductor 49 which extends outwardly from one end of the assembly. The projecting pin 39 of each coil assembly 41 may be conveniently inserted within the collets 38 of the depending pins 37 and as each coil assembly approaches the stripping mechanism 10, the pin 37 thereof is carried into engagement with a cam 50 which causes the pin to be moved from its initial vertical position to a horizontal position as clearly shown in Fig. 3. The horizontal positioning of the pin 37 brings the conductor 49 into association with the arcuate rod 30 and the conductor is thus directed upon the movement of the conveyor chain into the passageway 31. As the conductor enters the passageway 31 it is carried into association with contacting portions of the threads 14 of the stripping members 11 and in this connection it is to be understood that continuous rotation is imparted to the stripping members 11 through the drive shaft 26 which has a geared connection with the motor 47. These threads 14 of the stripping members 11 serve to remove a definite portion of the insulation of the conductor 49 and simultaneously cause the conductor to be fed lengthwise of the members 11. The cutting or scraping action of the blades 12 will be apparent from the disclosure in Fig. 5 wherein the conductor 49 is shown in operative association with sections of the threads 14. It will be observed that as the blades 12 of the stripping members 11 are alternately moved into upward scraping engagement with the conductor insulation, said conductor will be flexed toward the opposite stripping member by reason of such engagement. This flexing or yielding of the conductor will take place between two of the adjacent blades on the opposite stripping member as clearly shown in Fig. 5. By having the conductor flexibly or resiliently responsive to the alternate scraping engagement of the blades 12, the insulation may be positively removed without any danger of injury to the conductor core resulting from the scraping action of the blades.

A groove or recess 51 (Fig. 2) formed in each of the stripping members 11 receives the conductor 49 after it has been initially acted upon by the threads of the stripping members, and upon a subsequent movement of the conveyor mechanism 33 the conductor is fed through the remaining portion of the threads. Thus by having the grooves 51 the conductor is not engaged by the threads 14 during the dwell of the conveyor mechanism after the initial action of the threads upon the conductor. As the conductor 49 reaches the inner ends of the stripping mechanism 11 and is advanced from between the threads thereof a sudden drop in the surface of the cam 50 causes the pin 37 and companion collet 38 to be swung downwardly by gravity to the initial vertical position as clearly shown in Fig. 4. Thus it is to be apparent that after the conductor 49 has been fed between the threads throughout the entire extent of the stripping members 11, a predetermined portion of the insulation thereof will have been removed (Figs. 5 and 6). This permits of free access to the bare conductor core for the purpose of soldering said conductor to a head 52 of the heat coil assembly in the position clearly indicated by the dotted lines (Fig. 6).

An impregnated insulation is sometimes employed for use with the conductors of heat coil assemblies which contains wax and other materials of like nature. In order to prevent the accumulation of such waxy materials between the threads 14 of the stripping members 11, heat is supplied to these members 11 by means of an electrical heating element 54 of any suitable type which extends upwardly between the shanks 15. The heat received by the shanks 15 is transferred by conduction to the stripping members 11 and this heat is sufficient to melt the waxy materials and thereby prevent the clogging of the stripping teeth or threads.

In the operation of the apparatus, just described, continuous rotation is imparted to the drive shaft 26 and the Geneva driving wheel 46 through the action of the motor 47. This causes an intermittent movement of the endless conveyor mechanism 33 and a continuous rotary movement of the stripper members 11. Heat coil assemblies 41 may be manually inserted within the spring collets 38 and as said assemblies approach the stripping mechanism 10 the cam 50 causes the upward swinging thereof until the supporting pin 37 assumes a horizontal position and the arcuate guide rod 30 serves to properly guide the conductors 49 into the guideway 31. During one of the advancing movements of the conveyor mechanism 33 the conductor 49 is fed between a portion of the threads 14 of the stripping members and during the dwell following this movement the conductor is positioned within the grooves 51 so as to eliminate any deleterious effects which might result if the conductor were allowed to remain in contact with the rotating threads during the dwell of the conveyor mechanism. Upon the subsequent advancement of the conductor the remaining portions of the threads in the stripping members effectively remove any of the insulation which might be present upon the conductor core, and the coil assembly is then swung downwardly into a position to permit the removal thereof from the collet 38. By having the bearing block 18 slidable within the block 16, the outer stripping member 11 may be laterally adjusted in accordance with the size of the conductor which is to be stripped.

From the foregoing it will be apparent that the described apparatus presents a very effective means for continuously removing insulation from conductors so as to expose a predetermined portion of the conductor core without the slightest degree of injury thereto. The invention has been described in connection with a particular type of machine for stripping the insulation of a certain class of conductors, but it is to be clearly understood that the invention is capable of numerous other applications and therefore should be limited only by the scope of the appended claims.

What is claimed is:

1. The method of removing covering material from a core, which consists in advancing a covered core along a predetermined path and in a direction perpendicular to the longitudinal axis of the core, engaging the covered core to remove a predetermined portion of covering material therefrom, and in contemporaneously effecting the flexing of the core in response to the engagement therewith.

2. The method of removing insulation from a conductor, which consists in advancing an insulated conductor along a predetermined path and in a direction perpendicular to the longitudinal axis of the conductor, removing a predetermined intermediate portion of the insulation during the advancement thereof by scraping in a direction longitudinally of the conductor core, and in contemporaneously effecting the flexing of the conductor.

3. In apparatus for removing insulation from a conductor, a pair of parallel rotary stripping members having interrupted cooperating threads for receiving and stripping an insulated conductor, a conveyor for intermittently advancing insulated conductors between the rotary stripping members axially thereof, means for continuously rotating the stripping members, and means for intermittently actuating the conveyor.

4. In apparatus for removing covering material from a core, a rotary stripping means having peripheral threads for receiving and stripping a covered core, said threads being interrupted by circumferentially disposed spaces to present circumferential cutters, means for presenting the covered core across a space between adjacent cutters so that each cutter has a continuous cutting action for a substantial portion of the periphery of the rotary stripping means, and means for rotating said stripping means.

5. In apparatus for removing covering material from a core, a rotary stripping means having peripheral threads for receiving and stripping a covered core, said threads being interrupted by circumferentially disposed spaces to present circumferential cutters, means for presenting the covered core across a space between adjacent cutters so that each cutter has a continuous cutting action for a substantial portion of the periphery of the rotary stripping means, means for advancing the covered core longitudinally of the axis of said stripping means, and means for rotating said stripping means.

6. In apparatus for removing covering material from a core, a pair of adjacent rotary stripping members having cooperating threads carried by spaced radial members alternately engaging the work for stripping the covering material from the core, means for feeding the covered core between the rotary stripping members, and means for rotating said stripping members.

7. In apparatus for removing covering material from the core, a rotary stripping means having annular grooves for receiving and stripping a covered core, said grooves being interrupted by circumferentially disposed spaces to present circumferential cutters, means for presenting the covered core across a space between adjacent cutters so that each cutter has a continuous cutting action for a substantial portion of the periphery of the rotary stripping means, and means for rotating the stripping means.

8. In apparatus for removing covering material from a core, a rotary stripping means having peripheral threads for receiving and stripping a covered core, said threads being interrupted by circumferentially disposed spaces to present circumferential cutters, each cutter having a continuous cutting action for a substantial portion of the periphery of the rotary stripping means, means for rotating said stripping means, a conveyor means associated with said stripping means for supporting the covered core and for advancing the covered core longitudinally of the axis of said rotary stripping means, and means for actuating said conveyor means.

9. In apparatus for removing insulating material from a core, a pair of rotary stripping members having annular grooves for receiving and stripping the covering from a core, said grooves being interrupted by circumferentially disposed spaces to present circumferential cutters alternately engaging the covering material for stripping the covering material from the core, means for flexibly supporting the covered core and for moving the covered core into operative engagement with said rotary stripping means.

In witness whereof, I hereunto subscribe my name this 20th day of October, A. D. 1927.

CHESTER ALLISON METZGER.